(12) United States Patent
Niesen et al.

(10) Patent No.: US 9,048,935 B2
(45) Date of Patent: Jun. 2, 2015

(54) JOINT SYNCHRONIZATION AND MODULATION SCHEME FOR ENERGY-EFFICIENT COMMUNICATION

(71) Applicant: Alcatel-Lucent USA Inc., Murray Hill, NJ (US)

(72) Inventors: Urs Niesen, Summit, NJ (US); Piyush Gupta, Bridgewater, NJ (US); Yu-Chih Huang, College Station, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 199 days.

(21) Appl. No.: 13/750,213

(22) Filed: Jan. 25, 2013

(65) Prior Publication Data

US 2014/0211869 A1    Jul. 31, 2014

(51) Int. Cl.
  *H04L 27/00* (2006.01)
  *H04B 1/69* (2011.01)
  *H04L 25/49* (2006.01)

(52) U.S. Cl.
  CPC .............. *H04B 1/69* (2013.01); *H04L 25/4902* (2013.01); *H04L 25/4904* (2013.01)

(58) Field of Classification Search
  USPC ........................................................ 375/259
  See application file for complete search history.

(56) References Cited

U.S. PATENT DOCUMENTS

| | | | |
|---|---|---|---|
| 5,149,953 A * | 9/1992 | Erwin ............................ | 250/205 |
| 6,043,771 A * | 3/2000 | Clark et al. ..................... | 342/13 |
| 6,243,372 B1 * | 6/2001 | Petch et al. .................... | 370/350 |
| 7,486,747 B1 * | 2/2009 | Bagley et al. .................. | 375/324 |
| 7,864,887 B2 * | 1/2011 | Lui et al. ........................ | 375/316 |
| 8,035,551 B1 * | 10/2011 | Govoni .......................... | 342/189 |
| 2003/0227984 A1 * | 12/2003 | Batra et al. ..................... | 375/340 |
| 2006/0012511 A1 * | 1/2006 | Dooi et al. ...................... | 342/70 |
| 2010/0272150 A1 * | 10/2010 | Kil et al. ........................ | 375/130 |

OTHER PUBLICATIONS

Gallager, Robert G. et al. "Energy Limited Channels: Coding, Multiaccess, and Spread Spectrum" Laboratory for Information and Decision Systems, Massachusetts Institute of Technology, Room 35-206, Cambridge, MA 02139, USA. Nov. 1987.

Verdú, Sergio "On Channel Capacity per Unit Cost" IEE Transactions on Information Theory, vol. 36, No. 5, Sep. 1990.

Dobrushin, R.L., "Shannon's Theorems for Channels with Synchronization Errors" Problemy Peredachi Informatsii, vol. 3, No. 4, pp. 18-36, 1967.

Mitzenmacher, Michael "A Survey of Results for Deletion Channels and Related Synchronization Channels" Harvard University, School of Engineering and Applied Sciences. Probablility Surveys vol. 6 (2009) 1-33 ISSN: 1549-5787 DI: 10.1214/08-PS141.

Drinea, Eleni et al. "Improved Lower Bounds for the Capacity of i.i.d. Delection and Duplication Channels" IEE Transactions of Information Theory, vol. 53, No. 8, Aug. 2007.

(Continued)

*Primary Examiner* — Erin File
(74) *Attorney, Agent, or Firm* — Harness, Dickey & Pierce, P.L.C.

(57) ABSTRACT

A system including a transmitter and a receiver that are loosely synchronized, the transmitter encodes signal waveforms having a start time, a width and a height that are determined based on a range of possible relative drifts of a receiver clock with respect to a transmitter clock and the receiver decodes the waveforms based on a sequence of tests, chosen to account for any uncertainty that may arise due to the lack of tight synchronization.

23 Claims, 6 Drawing Sheets

(56) References Cited

OTHER PUBLICATIONS

Diggavi, Suhas et al. "Capacity Upper Bounds for the Delection Channel" ISIT2007, Nice, France, Jun. 24-Jun. 29, 2007.

Massey, James L. et al. "Optimum Fame Synchronization" IEE Transactions on Communications, vol. com-20, No. 2, Apr. 1972.

Chandar, Venkat et al. "Asynchronous Capacity per Unit Cost" ISIT 2010, Austin, Texas, U.S.A., Jun. 13-18, 2010.

\* cited by examiner

JOINT SYNCHRONIZATION AND MODULATION SCHEME FOR ENERGY-EFFICIENT COMMUNICATION

ACKNOWLEDGEMENT OF GOVERNMENT SUPPORT

This invention was made with Government support under Contract No. FA9550-09-1-0317, Subcontract No. 00006518, Job No. 95918. The Government has certain rights in this invention.

BACKGROUND OF THE INVENTION

Embodiments relate to a transmitter, a receiver, a system having the same and a method of communication between a transmitter and a receiver.

In a network, a transmitter Tx, operating according to a transmitter clock (TCLK), sends information over a communication channel to a receiver Rx, operating according to a receiver clock (RCLK). Each clock in the network is not ideal, in that the frequency of TCLK and RCLK may be different leading to drifts in the clock signal over time and/or the clock signal exhibiting jitters.

As illustrated in FIG. 1, due to these drifts and jitters, a time at the transmitter clock TCLK, illustrated on the x-axis, and a time at the receiver clock RCLK, illustrated on the y-axis, may become unsynchronized. In a network with ideal clocks, the receiver clock RCLK, shown on the y-axis, would increase at the same rate as the time at the transmitter clock TCLK, shown on the x-axis, making the line shown in FIG. 1 increase at a 45 degree slope. Further, in a network with ideal clocks, the line shown would not exhibit random jitters. To communicate with each other, the transmitter Tx and the receiver Rx need to account for the fact that the clocks at each end may not be synchronized.

Conventionally, clock errors are corrected in "tight synchronization" schemes by occasionally resynchronizing the transmitter Tx and the receiver Rx. Tight synchronization can be achieved by either separating data transmission between the transmitter Tx and the receiver Rx from synchronization or by incorporating synchronization with data transmission. In a conventional tight synchronization scheme that handles data transmission separately from synchronization, synchronization is achieved by periodic transmission of pilot signals. In a conventional tight synchronization scheme that combines synchronization with data transmission, data bits are modulated differentially at the transmitter Tx to enable synchronization at the receiver Rx.

SUMMARY OF THE INVENTION

The inventors have found that in energy efficient networks, the energy overhead of either method to achieve tight synchronization can become significant. For instance, the use of pilot signals to perform synchronization requires additional signaling and data processing at both the transmitter Tx and the receiver Rx. Likewise, modulating a signal differentially, while avoiding the additional sending of pilot signals, introduces signaling constraints that can reduce energy efficiency.

At least one example embodiment relates to a transmitter.

In one embodiment the transmitter is configured to communicate a first one of a plurality of messages to a receiver having a receiver clock. The transmitter including a transmitter clock and a modulator. The transmitter clock configured to generate a clock signal that controls timing of the transmitter, a timing of the transmitter clock running independent of a timing of the receiver clock. The modulator including a processor configured to, determine a start time, a width and a height of a pulse representing the first message based on a range of possible relative drifts of the receiver clock with respect to the transmitter clock, generate the determined pulse, and transmit the generated pulse to the receiver.

In one embodiment, the modulator is configured to determine the start time and the width of the pulse such that pulses representing any of the plurality of messages will not overlap when received by the receiver, if a drift of the receiver clock remains within the range of possible relative drifts with respect to the transmitter clock.

In one embodiment, the modulator is configured to determine the start time and the width such that a timing of reception at the receiver of any two of the plurality of messages transmitted by the transmitter do not overlap, if the receiver is operating within the range of possible relative drifts with respect to the transmitter.

In one embodiment, the transmitter further includes a converter configured to translate the pulse to a passband frequency.

In one embodiment, the modulator is configured to determine the height of the pulse based on a number of messages in the plurality of messages and the determined width of the message.

In one embodiment, the modulator is configured to determine the height such that transmission of each message of the plurality of messages consumes a same amount of signal energy.

In one embodiment, a pulse representing a second message of the plurality of messages has a greater width than the pulse representing the first message and a gap between the pulses representing each of the plurality of messages to the receiver sequentially increases.

In one embodiment, the start time of the pulse satisfies the equation:

$$N_m = \begin{cases} 0, & m = 1 \\ \frac{\mu_2}{\mu_1}(N_{m-1} + B_{m-1}), & m > 1 \end{cases}$$

where m is the message, $N_m$ is the start time for the message m, $\mu_1$ is a smallest relative drift within the range of possible relative drifts, $\mu_2$ is a largest relative drift within the range of possible relative drifts and $B_m$ is the width of the message m.

In one embodiment, the width of the pulse satisfies the equation:

$$B_m = \begin{cases} \log(M), & m = 1 \\ (\mu_2 - \mu_1)N_m, & m > 1 \end{cases}$$

where m is the message, $B_m$ is the width of the message m, M is the number of messages in the plurality of messages, $N_m$ is the start time for the message m, $\mu_1$ is a smallest relative drift within the range of possible relative drifts and $\mu_2$ is a largest relative drift within the range of possible relative drifts.

In one embodiment, the height of the pulse satisfies the equation:

$$H_m = \sqrt{\frac{2\ln(M)}{\mu_1 B_m}}$$

where m is the message, $H_m$ is the height of the message m, $B_m$ is the width of the message m, M is the number of messages in the plurality of messages and $\mu_1$ is a smallest relative drift within the range of possible relative drifts.

At least one example embodiment relates to a receiver.

In one embodiment, the receiver is configured to receive a waveform that includes a pulse representing a first of the plurality of messages from a transmitter having a transmitter clock. The receiver may include a receiver clock configured to generate a clock signal that controls timing of the receiver, a timing of the receiver clock running independent from the transmitter clock; a matched filter bank configured to contain a plurality of sample waveforms for at least one of the plurality of messages and output a plurality of values based on the received waveform and the plurality of sample waveforms; and a detector including a processor configured to estimate the first message based on the plurality of values output by the matched filter bank.

In one embodiment, the plurality of sample waveforms represent shifted versions of the pulse.

In one embodiment, the number of the plurality of sample waveforms is a same number for each of the plurality of messages.

In one embodiment, the plurality of values that the matched filter bank is configured to output represent a correlation between the plurality of sample waveforms and the received waveform.

In one embodiment, the receiver further includes an envelope detector configured to translate the received waveform containing a transmitted message from a passband frequency to a translated waveform having a baseband frequency.

In one embodiment, the plurality of values output by the matched filter bank is an inner product value satisfying the equation:

$$v_{m,l} = \int_{t=0}^{\mu_2 T} y(t)\phi_{m,l}(t)dt$$

where $v_{m,l}$ is one of the plurality of output values, m ranges over the plurality of messages, l is proportional to a number of clock ticks that the waveform is shifted and ranges over a plurality of shifts, t is time, T is a total duration of the waveform, $\mu_2$ is a largest relative drift of the receiver clock with respect to the transmitter clock, y(t) is the input signal to the matched filter bank at the time t, $\Phi_{m,l}$ is the waveform for the message m that has been shifted by the number of clock ticks proportional to l.

At least one example embodiment relates to a system.

In one example embodiment, the system includes a transmitter and a receiver. The transmitter configured to communicate a first one of a plurality of messages to the receiver having a receiver clock, the transmitter including a transmitter clock and a modulator. The transmitter clock is configured to generate a transmitter clock signal that controls timing of the transmitter, a timing of the transmitter clock running independent of a timing of the receiver clock. The modulator includes a processor configured to, determine a start time, a width and a height of a pulse representing the first message that are determined based on a range of possible relative drifts of the receiver clock with respect to the transmitter clock, generate the determined pulse, and transmit the generated pulse to the receiver. The receiver is configured to receive a waveform that includes the pulse representing the first of the plurality of messages. The receiver includes a matched filter bank configured to contain a plurality of sample waveforms for each of the plurality of messages and output a plurality of values based on the received waveform; and a detector including a processor configured to estimate the first message based on the plurality of values output by the matched filter bank.

In one embodiment, the modulator determines the start time and the width of the pulse such that pulses representing any of the plurality of messages will not overlap when received by the receiver, if a drift of the receiver clock remains within the range of possible relative drifts with respect to the transmitter clock.

In one embodiment, the height is determined such that transmission of each message of the plurality of messages consumes a same amount of signal energy.

In one embodiment, the plurality of values that the matched filter bank is configured to output represent a correlation between the plurality of sample waveforms and the received waveform.

At least one example embodiment relates to a method of communicating a first one of a plurality of messages from a transmitter operating according to a transmitter clock to a receiver operating according to a receiver clock.

In one embodiment, the method includes determining a start time, a width and a height of a pulse representing the first message that are determined based on a range of possible relative drifts of the receiver clock with respect to the transmitter clock, generating the determined pulse and transmitting the generated pulse to the receiver.

In one embodiment, the determining determines the start time and the width of the pulse such that pulses representing any of the plurality of messages will not overlap when received by the receiver, if a drift of the receiver clock remains within the range of possible relative drifts with respect to the transmitter clock.

In one embodiment, the method further includes determining the height such that transmission of each message of the plurality of messages consumes a same amount of signal energy.

In one embodiment, the method further includes receiving a waveform that includes the pulse representing the first of the plurality of messages; correlating the waveform against each of a plurality of sample waveforms stored in a matched filter bank, outputting a plurality of values based on the result of the correlating and estimating the first message based on the plurality of values output by the matched filter bank.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
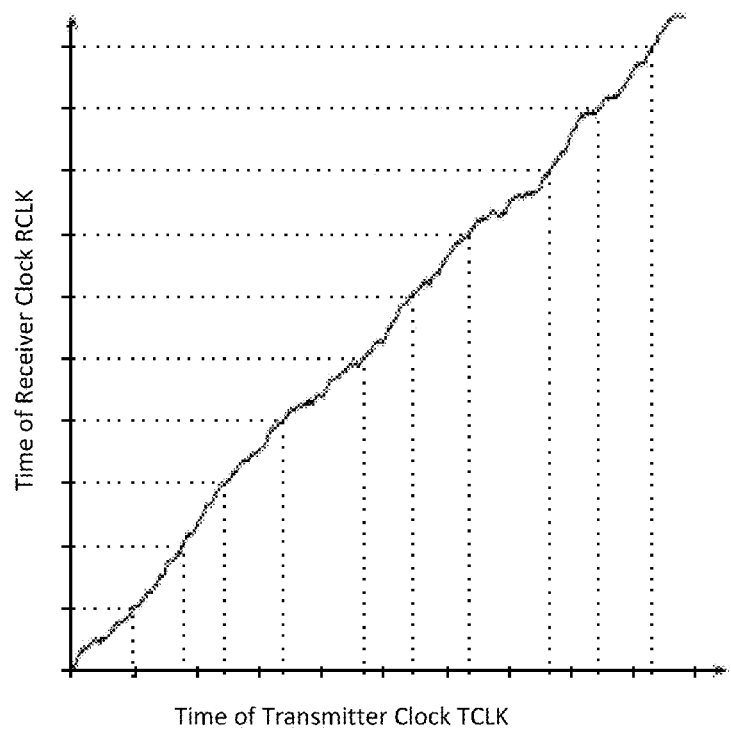
FIG. 1 illustrates an example of a signal sent between a transmitter Tx and a receiver Rx whose clocks are unsynchronized.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the tends "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

In one or more example embodiments, rather than maintaining the transmitter Tx and the receiver Rx in "tight synchronization" by occasionally resynchronizing the transmitter Tx and the receiver Rx, the transmitter Tx encodes new signal waveforms that have a signal energy that is spread over increasing intervals and guard spaces having increasing lengths inserted therein. The receiver RX decodes the waveforms based on a sequence of tests which are chosen to account for any uncertainty that may arise due to the lack of tight synchronization.

Figure 2:
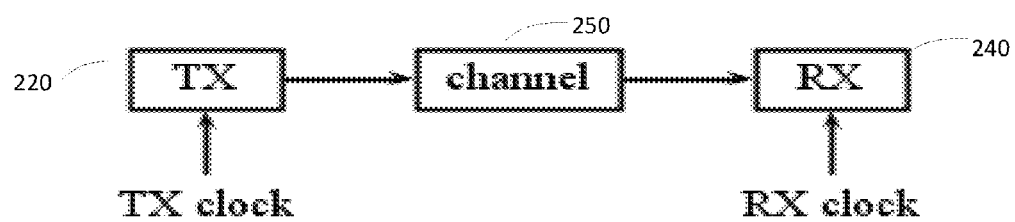
FIG. 2 illustrates a system having a transmitter Tx and a receiver Rx that are loosely synchronized according to an example embodiment.

FIG. 2 illustrates a system having a transmitter Tx and a receiver Rx that are loosely synchronized according to an example embodiment.

As shown in FIG. 2, system 200 includes a transmitter 220 and receiver 240 that communicate over a channel 250. As discussed above, the transmitter 220 receives a clock TCLK and the receiver 240 receives a clock RCLK that deviate and the deviation may be unknown. However, if the transmitter clock TCLK at the transmitter 220 is considered to be a reference clock, the quality of the receiver clock RCLK can be measured relative to the reference transmitter clock TCLK by a drift parameter $\mu$ that captures the relative speed of the receiver clock RCLK with respect to the transmitter clock TCLK.

A drift $\mu=1$ means that the transmitter clock TCLK and the receiver clock RCLK have the same speed. A drift $\mu<1$ means that the receiver clock RCLK runs slower than the transmitter clock TCLK. Likewise, a drift $\mu>1$ means that the receiver clock RCLK runs faster than the transmitter clock TCLK.

Further, the precision of the transmitter clock TCLK and receiver clock RCLK are usually known to lie within some range (e.g., a range specified in the manufacturer specifications that accompany the clock). From these ranges for the precision of TCLK and RCLK, the relative accuracy of the two clocks can be guaranteed to be between some bounds $0 < \mu_1 < 1 < \mu_2 < \infty$. In other words, the manufacturer specifications imply that the clock drift $\mu$ lies in the interval between $\mu_1$ and $\mu_2$.

Therefore, while the actual value of the drift $\mu$ of a particular clock may not be known, the bounds $\mu_1'$ and $\mu_2'$ of the transmitter clock TCLK and $\mu_1''$ and $\mu_2''$ of the receiver clock RCLK are known. If the bounds of drift at the transmitter clock TCLK and the receiver clock RCLK are known based on the manufacturer specifications, the bounds of the relative drift $\mu_1$ to $\mu_2$ of the receiver clock RCLK in relation to the transmitter clock TCLK can be calculated. For instance, $\mu_1 = \mu_1''/\mu_2'$ and $\mu_2''/\mu_1'$ FIG. 3A illustrates a transmitter according to an example embodiment.

Figure 3A:
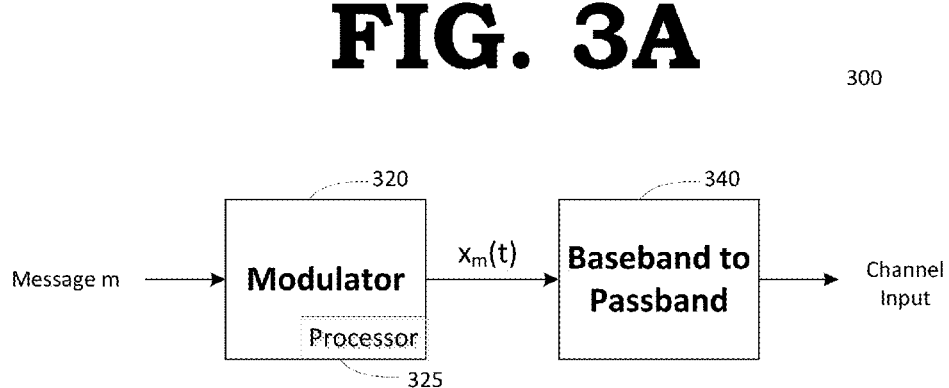
FIG. 3A illustrates a transmitter Tx according to an example embodiment.

As illustrated in FIG. 3A, a transmitter 300 includes a modulator 320 and a baseband to passband converter 340.

The modulator 320 includes a processor 325 configured to generate a waveform corresponding to a received message m. The baseband to passband converter 340 translates the waveform to a higher frequency used for transmission. It should be understood that the use of the baseband to passband converter 340 may be omitted for transmission within the baseband.

The modulator 320 is configured to take as input one of M possible messages m=1, 2, . . . , M and output a corresponding waveform $x_m(t)$.

Figure 3B:
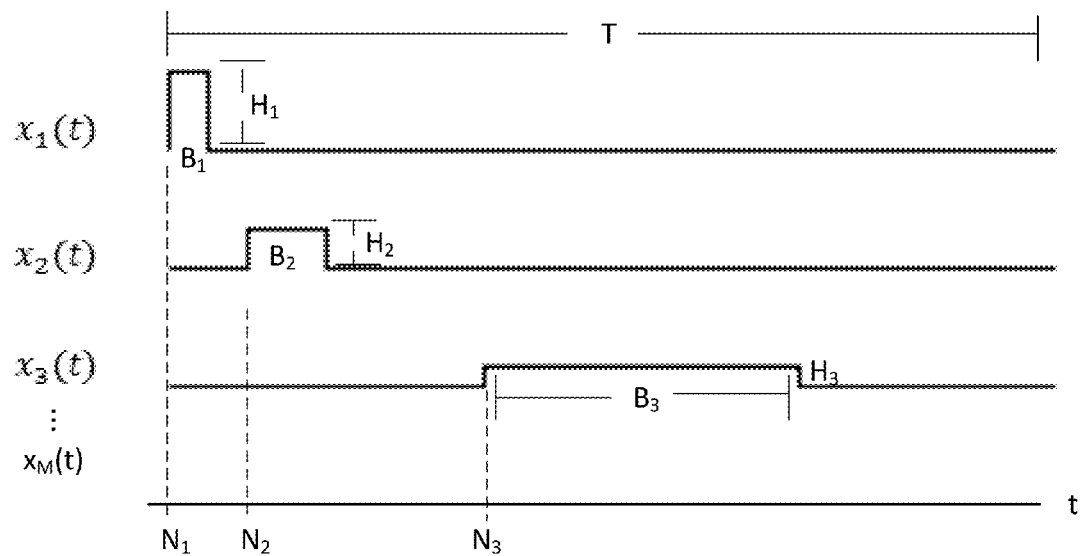
FIG. 3B illustrates pulses generated by the transmitter according to an example embodiment

FIG. 3B illustrates an example of the waveforms $x_m(t)$ generated by the modulator 320 according to an example embodiment.

As illustrated in FIG. 3B, for each message, the corresponding waveform $x_m(t)$ consists of a single pulse and two silent periods, one before and one after the pulse. The length of the silent periods are chosen such that each pair of pulse and associated silent periods together have a same duration T. The pulse is specified by the following three parameters: the start of the pulse $N_m$, the width of the pulse $B_m$, and the height of the pulse $H_m$, where these three parameters may vary depending on the value of the message m. Each of the M waveforms starts at $N_m$ and continues the width of the pulse $B_m$.

The parameters $N_m$ and $B_m$ are given by the recursive formulas (starting with m=1):

$$N_m = \begin{cases} 0, & m = 1 \\ \frac{\mu_2}{\mu_1}(N_{m-1} + B_{m-1}), & m > 1 \end{cases} \quad (1)$$

$$B_m = \begin{cases} \log(M), & m = 1 \\ (\mu_2 - \mu_1)N_m, & m > 1 \end{cases} \quad (2)$$

Using equations 1 and 2, the modulator 320 determines the start time $N_m$ and the width $B_m$ of the pulse that represents message m such that pulses representing any of the plurality of messages M will not overlap when received by a receiver, if a drift of a receiver clock RCLK remains within the range of possible relative drifts $\mu_1$ to $\mu_2$ with respect to the transmitter clock TCLK.

Further, the modulator 320 is configured to determine the start time $N_m$ and the width $B_m$ of the pulse such that a timing of reception at a receiver of any two of the plurality of messages M transmitted by the transmitter 300 do not overlap, if the receiver is operating within the range of possible relative drifts $\mu_1$ to $\mu_2$ with respect to the transmitter 300.

The parameter $H_m$ is given by $$H_m = \sqrt{\frac{2\ln(M)}{\mu_1 B_m}} \qquad (3)$$

By varying $H_m$ according to equation 3, all M waveforms have the same signal energy $2\ln(M)/\mu_1$.

Figure 4:
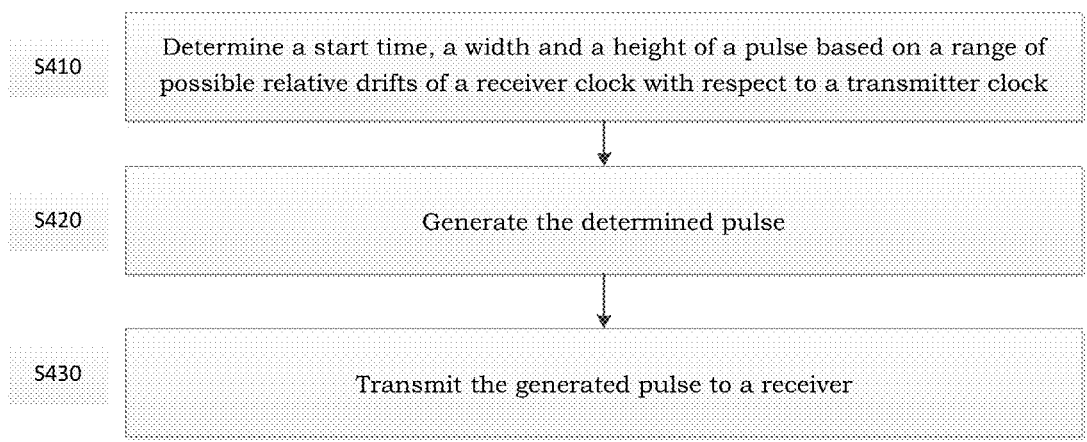
FIG. 4 illustrates a method of communicating a first one of a plurality of messages according to an example embodiment.

FIG. 4 illustrates a method of communicating a first one of a plurality of messages according to an example embodiment.

As illustrated in FIG. 4, in step S410, the modulator 320 or processor 340 determines the start time $N_m$, the width $B_m$ and the height $H_m$ of a pulse based on a range of possible relative drifts $\mu_1$ to $\mu_2$ of a receiver clock RCLK with respect to a transmitter clock TCLK.

In step S420, the modulator 320 generates the determined pulse and in step S430 the modulator 320 transmits the generated pulse to a receiver, for example the receiver 500.

Figure 5A:
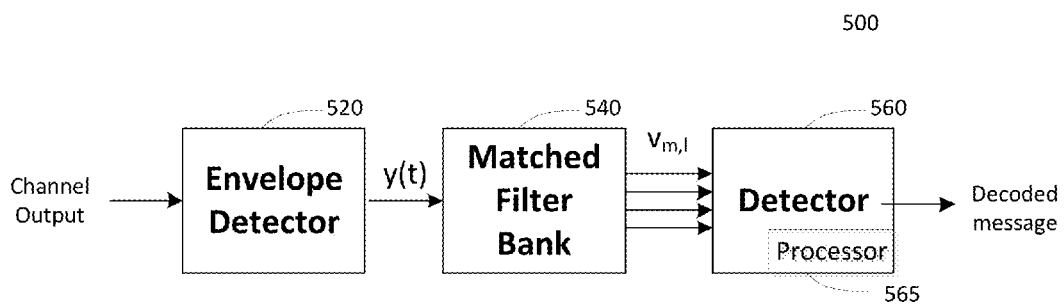
FIG. 5A illustrates a receiver Rx according to an example embodiment.

FIG. 5A illustrates a receiver according to an example embodiment.

As illustrated in FIG. 5A, a receiver 500 is configured to perform decoding using an envelope detector 520, a matched filter bank 540 and a detector 560.

The envelope detector 520 translates the waveform to a lower frequency. The use of the envelope detector 520 may be omitted if the received waveform is within the baseband.

The matched filter bank 540 at the receiver contains a plurality of sample waveforms $\phi_{m,l}$ for each of the M waveforms and is configured to output several values $v_{m,l}$ based on an input signal y(t).

Figure 5B:
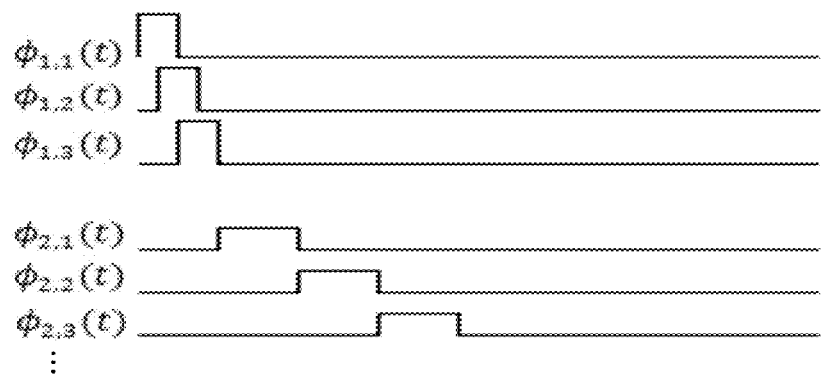
FIG. 5B illustrates a plurality of sample waveforms for each of a plurality of messages stored in a matched filter bank at the receiver according to an example embodiment.

FIG. 5B illustrates a plurality of sample waveform is for each of a plurality of messages stored in the matched filter bank 540 according to an example embodiment.

As illustrated in FIG. 5B, the matched filter bank 540 contains a plurality of sample waveforms $\phi_{m,l}$ for each message m of the plurality of messages M. The matched filtered bank 540 may be implemented using software, hardware, firmware or a combination thereof. When the matched filtered bank 540 is implemented using software, a processor, such as processor 565, may be configured to execute the matched filtered bank 540.

For each message m, the plurality of sample waveforms $\phi_{m,l}$ represent the waveform that contains the pulse corresponding to message m where each of the plurality of sample waveforms are shifted by a different amount l. The matched filter bank 540 correlates the received waveform with the plurality of sample waveforms $\phi_{m,l}$ and outputs a plurality of values based on the result of the sampling.

Figure 5C:
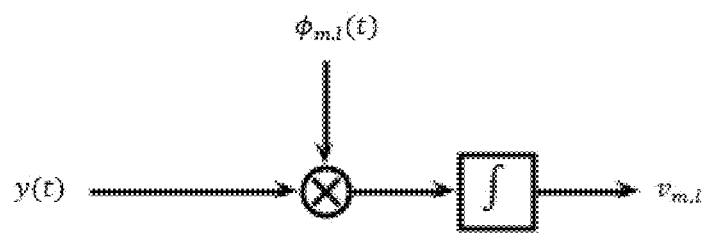
FIG. 5C illustrates an example of calculating one of the plurality of values output from the matched filter bank according to an example embodiment.

FIG. 5C illustrates an example of calculating one of the plurality of values output from the matched filter bank 540 according to an example embodiment.

As illustrated in FIG. 5C, each of the plurality of values output by the matched filter bank 540 is an inner product value $v_{m,l}$ representing the input signal y(t) multiplied with one of the waveforms $\phi_{m,l}(t)$. Both y(t) and $\phi_{m,l}(t)$ have a length $\mu_2 T$ and the inner product value $v_{m,l}$ satisfies the equation:

$$v_{m,l} = \int_{t=0}^{\mu_2 T} y(t)\phi_{m,l}(t)dt \qquad (4)$$

where the times t and T is as measured relative to the receiver clock RCLK, m ranges from 1 to M and corresponds to one of the M messages; l is proportional to a number of clock ticks that the waveform is shifted and ranges over a plurality of shifts 0 to [log(M)] Using equation 4, the matched filter bank 540 outputs l number of product values $v_{m,l}$ for each of the M messages, where l is an integer.

The waveform $\phi_{m,l}(t)$ consists again of a single pulse. The width of the pulse is $\mu_1 B_m$. The height of the pulse is 1. The start of the pulse is:

$$\left(\mu_1 + l\frac{\mu_2 - \mu_1}{\lceil\log(M)\rceil}\right)N_m \qquad (5)$$

The detector 560 includes a processor 565 configured to estimate the message transmitted by the transmitter. While the processor 565 is shown as being part of the detector 560, the processor 565 may be part of the matched filter bank 540 or the matched filter bank 540 may include a separate processor.

The detector 560 estimates the transmitted message by taking as input the different inner product values $v_{m,l}$ computed by the matched filter bank 540 and outputting an estimate of the transmitted message. The detector 560 estimates the transmitted message by finding the largest of the plurality of values $v_{m,l}$ and declares an index value associated with the detected $v_{m,l}$ as the estimate of the transmitted message m.

Figure 6:
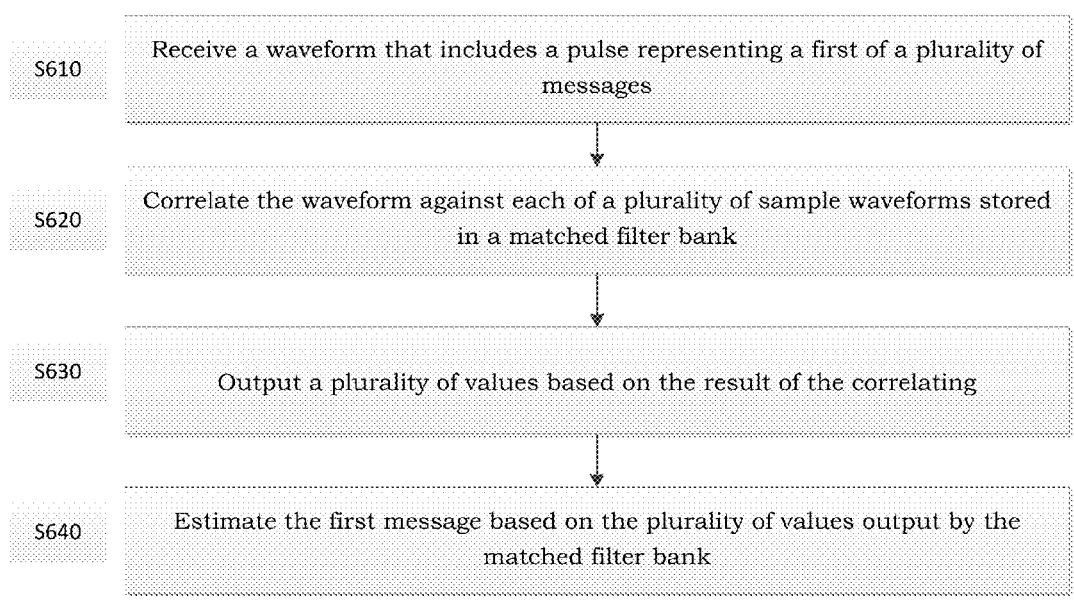
FIG. 6 illustrates a method of communicating a first one of a plurality of messages according to another example embodiment.

FIG. 6 illustrates a method of communicating a first one of a plurality of messages according to another example embodiment.

As illustrated in FIG. 6, in step S610 the receiver 500 receives a waveform that includes a pulse representing a first of the plurality of messages. In step S620, the matched filter bank 540 correlates the waveform against each of a plurality of sample waveforms. In step S630, the matched filter bank 540 outputs a plurality of values based on the result of the correlating. In step S640, the detector 560 estimates the first message based on the plurality of values output by the matched filter bank 540.

While example embodiments have been particularly shown and described, it will be understood by one of ordinary skill in the art that variations in form and detail may be made therein without departing from the spirit and scope of the claims.

We claim:

1. A transmitter configured to communicate a first one of a plurality of messages to a receiver having a receiver clock, the transmitter comprising:
    a transmitter clock configured to generate a clock signal that controls timing of the transmitter, a timing of the transmitter clock running independent of a timing of the receiver clock; and
    a modulator including a processor configured to,
        determine a start time, a width and a height of a pulse representing the first message based on a range of possible relative drifts of the receiver clock with respect to the transmitter clock,
        generate the determined pulse, and
        transmit the generated pulse to the receiver.

2. The transmitter of claim 1, wherein the modulator is configured to determine the start time and the width of the pulse such that pulses representing any of the plurality of messages will not overlap when received by the receiver, if a drift of the receiver clock remains within the range of possible relative drifts with respect to the transmitter clock.

3. The transmitter of claim 1, wherein the modulator is configured to determine the start time and the width such that a timing of reception at the receiver of any two of the plurality of messages transmitted by the transmitter do not overlap, if the receiver is operating within the range of possible relative drifts with respect to the transmitter.

4. The transmitter of claim 1, further comprising:
a converter configured to translate the pulse to a passband frequency.

5. The transmitter of claim 1, wherein the modulator is configured to determine the height of the pulse based on a number of messages in the plurality of messages and the determined width of the pulse.

6. The transmitter of claim 5, wherein the modulator is configured to determine the height such that transmission of each message of the plurality of messages consumes a same amount of signal energy.

7. The transmitter of claim 1, wherein the modulator is configured to generate pulses for each of the plurality of messages and a gap therebetween, each gap being larger than a preceding gap.

8. The transmitter of claim 1, wherein the start time of the pulse satisfies the equation:

$$N_m = \begin{cases} 0, & m = 1 \\ \frac{\mu_2}{\mu_1}(N_{m-1} + B_{m-1}), & m > 1 \end{cases}$$

where m is the message, $N_m$ is the start time for the message m, $\mu_1$ is a smallest relative drift within the range of possible relative drifts, $\mu_2$ is a largest relative drift within the range of possible relative drifts and $B_m$ is the width of the message m.

9. The transmitter of claim 1, wherein the width of the pulse satisfies the equation:

$$B_m = \begin{cases} \log(M), & m = 1 \\ (\mu_2 - \mu_1)N_m, & m > 1 \end{cases}$$

where m is the message, $B_m$ is the width of the message m, M is the number of messages in the plurality of messages, $N_m$ is the start time for the message m, $\mu_1$ is a smallest relative drift within the range of possible relative drifts and $\mu_2$ is a largest relative drift within the range of possible relative drifts.

10. The transmitter of claim 1, wherein the height of the pulse satisfies the equation:

$$H_m = \sqrt{\frac{2 \ln(M)}{\mu_1 B_m}}$$

where m is the message, $H_m$ is the height of the message m, $B_m$ is the width of the message m, M is the number of messages in the plurality of messages and $\mu_1$ is a smallest relative drift within the range of possible relative drifts.

11. A receiver comprising:
a receiver clock configured to generate a clock signal that controls timing of the receiver, such that, when the receiver receives a waveform that includes a pulse representing a first of the plurality of messages from a transmitter whose timing is controlled by a transmitter clock that runs independent of the receiver clock, the pulse does not overlap with a subsequent pulse from the transmitter due to a start time, a width and a height of the pulse being determined based on a range of a relative drifts of the receiver clock with respect to the transmitter clock even though the timing of the receiver clock runs independent from the timing of the transmitter clock;
a matched filter bank configured to contain a plurality of sample waveforms for one of the plurality of messages and output a plurality of values based on the received waveform and the plurality of sample waveforms; and
a detector including a processor configured to estimate the first message based on the plurality of values output by the matched filter bank.

12. The receiver of claim 11, wherein the plurality of sample waveforms represent shifted versions of the pulse.

13. The receiver of claim 11, wherein the number of the plurality of sample waveforms is a same number for each of the plurality of messages.

14. The receiver of claim 11, wherein the plurality of values that the matched filter bank is configured to output represent a correlation between the plurality of sample waveforms and the received waveform.

15. The receiver of claim 11, further comprising:
an envelope detector configured to translate the received waveform containing a transmitted message from a passband frequency to a translated waveform having a baseband frequency.

16. The receiver of claim 11, wherein the plurality of values output by the matched filter bank is an inner product value satisfying the equation:

$$v_{m,l} = \int_{t=0}^{\mu_2 T} y(t) \phi_{m,l}(t) dt$$

where $v_{m,l}$ is one of the plurality of output values, m ranges over the plurality of messages, l is proportional to a number of clock ticks that the waveform is shifted and ranges over a plurality of shifts, t is time, T is a total duration of the waveform, $\mu_2$ is a largest relative drift of the receiver clock with respect to the transmitter clock, y(t) is the input signal to the matched filter bank at the time t, $\phi_{m,l}$ is the waveform for the message m that has been shifted by the number of clock ticks proportional to l.

17. A system comprising:
a transmitter and a receiver,
the transmitter configured to communicate a first one of a plurality of messages to the receiver having a receiver clock, the transmitter including,
a transmitter clock configured to generate a transmitter clock signal that controls timing of the transmitter, a timing of the transmitter clock running independent of a timing of the receiver clock; and
a modulator including a processor configured to,
determine a start time, a width and a height of a pulse representing the first message based on a range of possible relative drifts of the receiver clock with respect to the transmitter clock,
generate the determined pulse, and
transmit the generated pulse to the receiver;
the receiver configured to receive a waveform that includes the pulse representing the first of the plurality of messages, the receiver including,
a matched filter bank configured to contain a plurality of sample waveforms for at least one of the plurality of messages and output a plurality of values based on the received waveform and the plurality of sample waveforms; and
a detector including a processor configured to estimate the first message based on the plurality of values output by the matched filter bank.

18. The system of claim 17, wherein the modulator is configured to determine the start time and the width of the pulse such that pulses representing any of the plurality of messages will not overlap when received by the receiver, if a drift of the receiver clock remains within the range of possible relative drifts with respect to the transmitter clock.

19. The system of claim 17, wherein the modulator is configured to determine the height such that transmission of each message of the plurality of messages consumes a same amount of signal energy.

20. The system of claim 17, wherein the plurality of values that the matched filter bank is configured to output represent a correlation between the plurality of sample waveforms and the received waveform.

21. A method of communicating a first one of a plurality of messages from a transmitter operating according to a transmitter clock to a receiver operating according to a receiver clock, the method comprising:
 determining a start time, a width and a height of a pulse representing the first message based on a range of possible relative drifts of the receiver clock with respect to the transmitter clock;
 generating the determined pulse; and
 transmitting the generated pulse to the receiver.

22. The method of claim 21, wherein the determining determines the start time and the width of the pulse such that pulses representing any of the plurality of messages will not overlap when received by the receiver, if a drift of the receiver clock remains within the range of possible relative drifts with respect to the transmitter clock.

23. The method of claim 21, further comprising:
 receiving a waveform that includes the pulse representing the first of the plurality of messages;
 correlating the waveform against each of a plurality of sample waveforms stored in a matched filter bank;
 outputting a plurality of values based on the result of the correlating; and
 estimating the first message based on the plurality of values output by the matched filter bank.

* * * * *